United States Patent
Cheng et al.

(10) Patent No.: US 6,233,595 B1
(45) Date of Patent: May 15, 2001

(54) FAST MULTIPLICATION OF FLOATING POINT VALUES AND INTEGER POWERS OF TWO

(75) Inventors: Lei Cheng; Frank J. Gorishek, IV; Yi Liu, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/075,074

(22) Filed: May 8, 1998

(51) Int. Cl.⁷ .................................................. G06F 9/302
(52) U.S. Cl. ......................... 708/503; 708/512; 708/517; 712/222
(58) Field of Search .................................. 708/517, 503, 708/512; 712/222

(56) References Cited

U.S. PATENT DOCUMENTS 5,197,024 * 3/1993 Pickett .................................. 708/517
5,623,527 * 4/1997 Scott ...................................... 377/72

OTHER PUBLICATIONS

A.D. Booth, "A Signed Binary Multiplication Technique," Quarterly Journal of Mechanics and Applied Materials, vol. 4, No. 2, pp. 236–240, 1951.

Bewick & Flynn, "Binary Multiplication Using Partially Redundant Multiples," Technical Report No. CSL–TR–92–528M, Jun. 1992, Departments of Electrical Engineering and Computer Science, Stanfor University (26 sheets).

Hennessy & Patterson, "Computer Architecture: A Quantitative Approach," pp. A–2 to A–16 and A–20 to A–22, Morgan Kaufmann Publishers, Palo Alto California, 1990.

IEEE–754 Binary Floating–Point Arithmetic (READ), IEEE Standards, revised 1998, pp. 1–18.

* cited by examiner

Primary Examiner—Kenneth S. Kim
(74) Attorney, Agent, or Firm—Conley, Rose & Tayon, P.C.

(57) ABSTRACT

A method for performing fast multiplication in a microprocessor is disclosed. The method comprises detecting multiplication operations that have a floating point operand and an integer operand, wherein the integer operand is an integer power of two. Once detected, a multiplication operation meeting these criteria may be executed by using an integer adder to sum the integer power and the floating point operand's exponent to from a product exponent. The bias of the integer operand's exponent may also be subtracted. A product mantissa is simply copied from the floating point operand's mantissa. The floating point operand's sign bit may be inverted to form the product's sign bit if the integer operand is negative. Advantageously, the product is generated using integer addition which is faster than floating point multiplication. The method may be implemented in hardware or software.

20 Claims, 5 Drawing Sheets

| 31 | 30 | 22 | 0 |
|---|---|---|---|
| SIGN (s) | BIASED EXPONENT (be) | MANTISSA (f) | |

SINGLE PRECISION FLOATING POINT ⬉ 206

Floating Point Number = $(-1)^s \times 2^{(be-ebias)} \times 1.f$ ⬉ 216a ebias = 127 ⬉ 216b

| 63 | 62 | 51 | 0 |
|---|---|---|---|
| SIGN (s) | BIASED EXPONENT (be) | MANTISSA (f) | |

DOUBLE PRECISION FLOATING POINT ⬉ 208

Floating Point Number = $(-1)^s \times 2^{(be-ebias)} \times 1.f$ ⬉ 218a ebias = 1023 ⬉ 218b

| 79 | 78 | 63 | 0 |
|---|---|---|---|
| SIGN (s) | BIASED EXPONENT (be) | MANTISSA (f) | |

EXTENDED DOUBLE PRECISION FLOATING POINT ⬉ 210

Floating Point Number = $(-1)^s \times 2^{(be-ebias)} \times 0.f$ ⬉ 220a ebias = 16383 ⬉ 220b

Fig. 2

| | |
|---|---|
| 0000 0000 0000 0000 0000 0000 0000 0100$_2$ | SHORT (32-BIT) INTEGER FORM |
| 0 | SIGN BIT |
| x 1000 0011 xxxx xxxx xxxx xxxx xxxx xxx | BIASED EXPONENT ($3_{10}$ + BIAS OF $127_{10}$) |
| x xxxx xxxx 0000 0000 0000 0000 0000 000 | MANTISSA (23 BITS) |
| 0 1000 0011 0000 0000 0000 0000 0000 000$_2$ | SINGLE PRECISION (32-BIT) FLOATING POINT FORM |

Fig. 4

```
MOV   EAX, DWORD PTR [float_number+4]   ; load float to EAX register
ADD   EAX, 00100000H                    ; add constant to the float's exponent
MOV   DWORD PTR [float_number+4], EAX   ; output contents of EAX register
```

Double Precision Translation

Fig. 5

```
MOV   EAX, DWORD PTR [float_number+8]   ; load float to EAX register
ADD   EAX, 01H                          ; add constant to the float's exponent
MOV   DWORD PTR [float_number+8], EAX   ; output contents of EAX register
```

Extended Precision Translation

Fig. 6

FAST MULTIPLICATION OF FLOATING POINT VALUES AND INTEGER POWERS OF TWO

BACKGROUND OF THE INVENTION

1. Field of the Invention

This invention relates generally to the field of floating point arithmetic in microprocessors and software.

2. Description of the Related Art

Most microprocessors are configured to operate on multiple data types, with the most common data types being integer and floating point. Integer numbers are positive or negative whole numbers, i.e., they have no fractional component. In contrast, floating point numbers are real numbers and have both a fractional component and an exponent.

Each different data type is stored in memory using a different format. Turning now to FIG. 1, a diagram illustrating a number of the most common data type formats as implemented in the x86 instruction set is shown. As the figure illustrates, integers may be stored in three different precisions, word integer 200, short integer 202, and long integer 204, each having the least significant bit stored as bit 0. In order to represent both positive and negative integers, most instruction sets assume that two's complement notation will be used to store negative integers. To represent a negative integer in two's complement form, the magnitude (or absolute value) of the integer is inverted in a bit-wise manner, and a one is added to the least significant bit. For example, to negate $+7_{10}$ ($0111_2$), each bit is inverted ($1000_2$) to obtain the one's complement version. Then a constant one is added to the least significant bit to obtain $-7_{10}$ ($1001_2$). Two's complement form is particularly useful because it allows positive and negative integers to be added using simple combinatory logic. Using the previous example, $+7_{10}$ ($0111_2$)+$-7_{10}$($1001_2$)=$0_{10}$($0000_2$).

As FIG. 1 illustrates, floating point numbers may also be stored in three different precisions; single precision 206, double precision 208, and extended double precision 210. Floating point numbers are represented by a sign bit, an exponent, and a mantissa (or significand). An asserted sign bit represents a negative value, whereas an unasserted sign bit represents a positive value. A floating point number's base (usually 2) is raised to the power of the exponent and multiplied by the mantissa to arrive at the number represented. The mantissa comprises a number of bits used to represent the most significant digits of the number. Typically, the mantissa comprises one bit to the left of the decimal, and the remaining bits to the right of the decimal. The bit to the left of the decimal, known as the integer bit, is usually not explicitly stored. Instead, it is implied in the format of the number. Additional information regarding the floating point numbers and operations performed thereon may be obtained in the Institute of Electrical and Electronic Engineers (IEEE) Standard 754.

Floating point formats can represent numbers within a much larger range than integer formats. For example, a 32-bit signed integer can represent the integers between $2^{31}-1$ and $-2^{31}$, when two's complement format is used. A single precision floating point number as defined by IEEE Standard 754 comprises 32 bits (a one bit sign, an 8 bit biased exponent, and a 23-bit mantissa) and has a range from approximately $2^{-126}$ to $2^{127}$ in both positive and negative numbers. A double precision (64-bit) floating point value has a range from approximately $2^{-1022}$ and $2^{1023}$ in both positive and negative numbers. Finally, an extended precision (80-bit) floating point number (in which the integer bit is explicitly stored) has a range from approximately $2^{-16382}$ to $2^{16383}$ in both positive and negative numbers.

Turning now to FIG. 2, more detail of each floating point precision is shown. Equation 216a represents a formula for determining the actual value of a number in single precision floating point format. As equation 216b illustrates, the exponent bias in single precision format is $+127_{10}$. Similarly, equations 218a and 220a are formulas for determining the actual values of numbers in double and extended precision, respectively. The exponent bias for double precision is $+1023_{10}$ (see 218b), and the exponent bias for extended precision is $+16,383_{10}$ (see 220b).

In order to perform calculations more efficiently, microprocessors typically have optimized circuitry to execute arithmetic operations on each data type. The simplest circuit may be configured to form perform addition or subtraction on integer values. As shown in the example above, integer addition and subtraction may be performed using simple combinatorial and inverting logic. This logic is typically referred to as an adder. In contrast, the most complex circuitry is typically for performing multiplication or division on floating point values. This complex circuitry is typically referred to as a multiplier. Multipliers are complex because each multiplication operation is translated into a plurality of additions. The number of additions that must be performed increase with the bit-length of the operands. The multiplication of floating point values is further complicated, because the resulting product must be "normalized." Normalization involves shifting the mantissa so that the most significant asserted bit is directly the right of the binary radix point. The product's exponent must also be incremented or decremented accordingly.

As a result of these inherent complications in multiplication, and floating point multiplication in particular, these instruction typically take significantly more clock cycles to complete than simple integer addition instructions. For example, a floating point multiplication may require on the order of five to ten clock cycles to complete, whereas an integer addition may be completed in just one clock cycle. Many microprocessors are configured with more than one adder configured to perform integer addition, which makes the effective throughput of integer addition instructions greater than one instruction per clock cycle. In contrast, microprocessors rarely have the die space available to implement more than one floating point multiplier. These factors contribute to an even greater disparity between integer addition and floating point multiplication performance.

Recent advances in microprocessor and software design have placed a greater emphasis upon arithmetic performance than ever before. Applications such as 3D graphics rendering and texture mapping rely heavily upon a microprocessor's ability to quickly execute large numbers of arithmetic operations, and floating point arithmetic operations in particular. Another application placing even heavier demands upon a microprocessor's floating point arithmetic capabilities is the compression and decompression of digital audio and video data. As a result, a method and apparatus for increasing a microprocessor's ability to rapidly execute floating point arithmetic instructions is needed.

SUMMARY

The problems outlined above are in large part solved by a method for performing fast multiplication in accordance with the present invention.

In one embodiment, the method involves detecting multiplication operations that have a floating point operand and an integer operand than is an integer power of two, e.g., $\pm 2^{-1}$, $\pm 2^0$, $\pm 2^1$, $\pm 2^2$, et seq. Once detected, the multiplication operations are executed by using an adder to sum the integer power and the floating point operand's exponent. Advantageously, the floating point multiplication instruction is executed using the faster integer adder in lieu of the slower floating point multiplier. In order to support positive and negative values, the method may further comprise inverting the floating point operand's sign bit to generate the product's sign bit if the integer operand is negative.

Also contemplated is a method for accelerating data decompression. In one embodiment the method comprises detecting floating point operands that are to be multiplied by an integer value to form a product. Next, the integer value is examined to determine whether the integer value has an absolute value equal to an integer power of two. If so, the product is formed by adding the integer power to the floating point operand's exponent. If, on the other hand, the integer value has an absolute value that is not equal to an integer power of two, then the product is formed by multiplication. As in the previous embodiment, this method may also comprise inverting the floating point operand's sign bit to generate the product's sign bit if the integer operand is negative.

A microprocessor configured to perform fast multiplication is also contemplated. In one embodiment, the microprocessor may comprise a means for detecting multiplication instructions having a floating point operand and an integer operand having an absolute value that is equal to an integer power of two. The microprocessor may further comprise a means for performing the multiplication instructions by adding the integer power to the floating point operand's exponent. This embodiment may also comprise an inverter configured to invert the floating point operand's sign bit to generate the product's sign bit if the integer operand is negative.

A software program embodied on computer-readable media is also contemplated. In one embodiment the program may comprise two pluralities of instructions: (1) a first plurality of instructions configured to form the product of a floating point number and an integer number having an absolute value equal to an integer power of two by adding the integer power to the floating point number's exponent, and (2) a second plurality of instructions configured to invert the floating point number's sign bit if the integer number is negative. In one embodiment, the software program may be realized as a dynamically linked library configured to perform decoding of compressed digital audio data.

An optimizing software compiler embodied on computer-readable media is also contemplated. The compiler may also comprise two pluralities of instructions: (1) a first plurality of instructions configured to detect multiplication instructions having a floating point operand and a constant integer operand having an absolute value equaling an integer power of two; and (2) a second plurality of instructions configured to replace the multiplication instruction with an addition instruction, wherein the addition instruction is configured to add the integer power to the floating point operand's exponent. The addition instruction may also be configured to invert the floating point operand's sign bit to generate the product's sign bit if the integer is negative.

A method of using a computer processor to decode compressed audio data is also contemplated. In one embodiment the method may comprise reading compressed audio data and detecting any floating point values that are to be multiplied by an integer having an absolute value equal to an integer power of two. The integer power may then be added to the floating point value's exponent. The floating point value's sign bit may also be inverted if the integer is negative.

BRIEF DESCRIPTION OF THE DRAWINGS

Other objects and advantages of the invention will become apparent upon reading the following detailed description and upon reference to the accompanying drawings in which:

FIG. 2 is a diagram illustrating details of the three floating point data formats from FIG. 1.

FIG. 4 is a diagram illustrating one embodiment of an integer stored in floating point format.

FIG. 5 illustrates one embodiment of a code segment that may used to implement fast double precision multiplication for integers that are integer powers of two.

FIG. 6 illustrates one embodiment of a code segment that may used to implement fast extended precision multiplication for integers that are integer powers of two.

Figure 1:
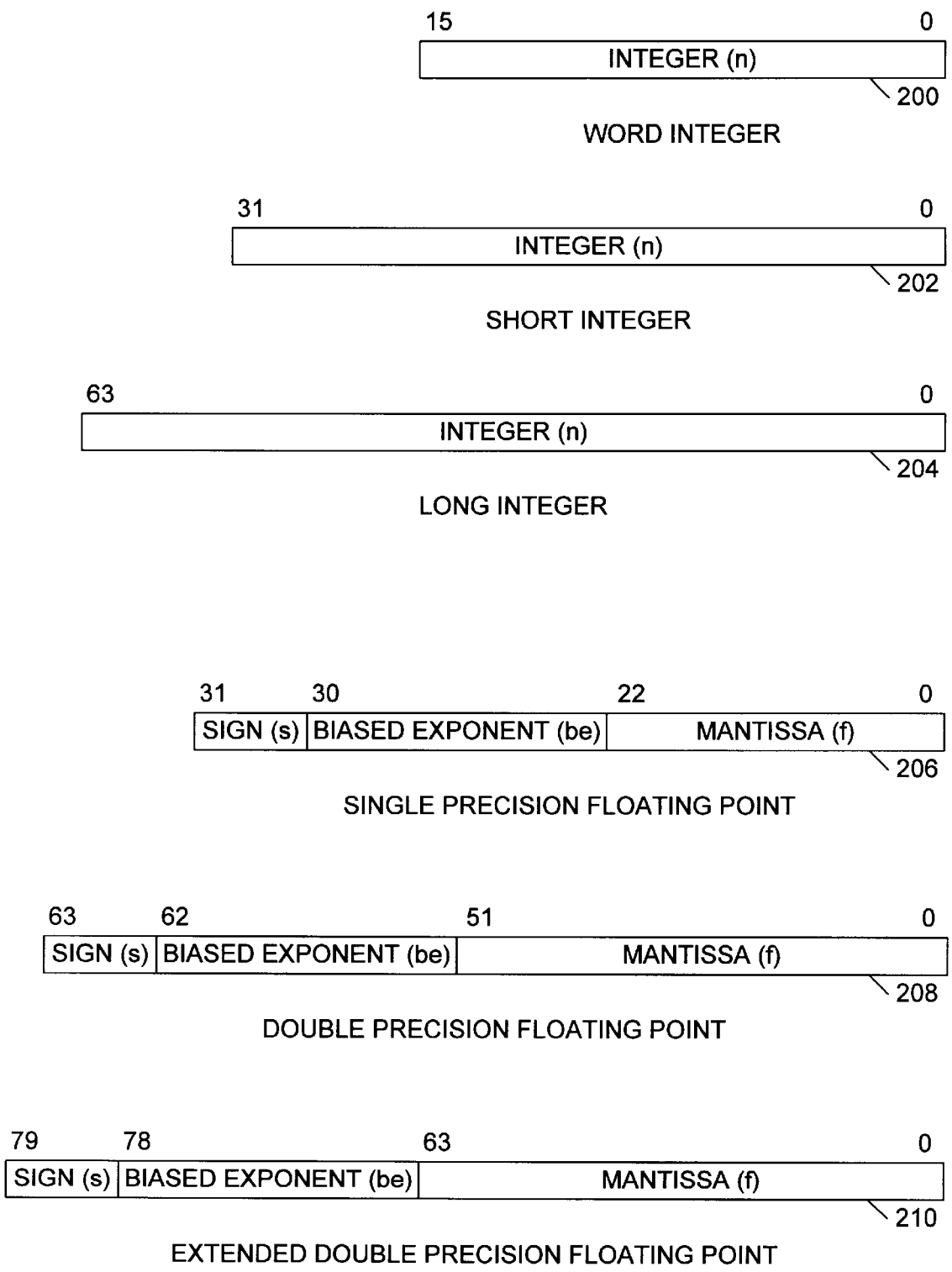
FIG. 1 is a diagram illustrating exemplary integer and floating point data formats and precisions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
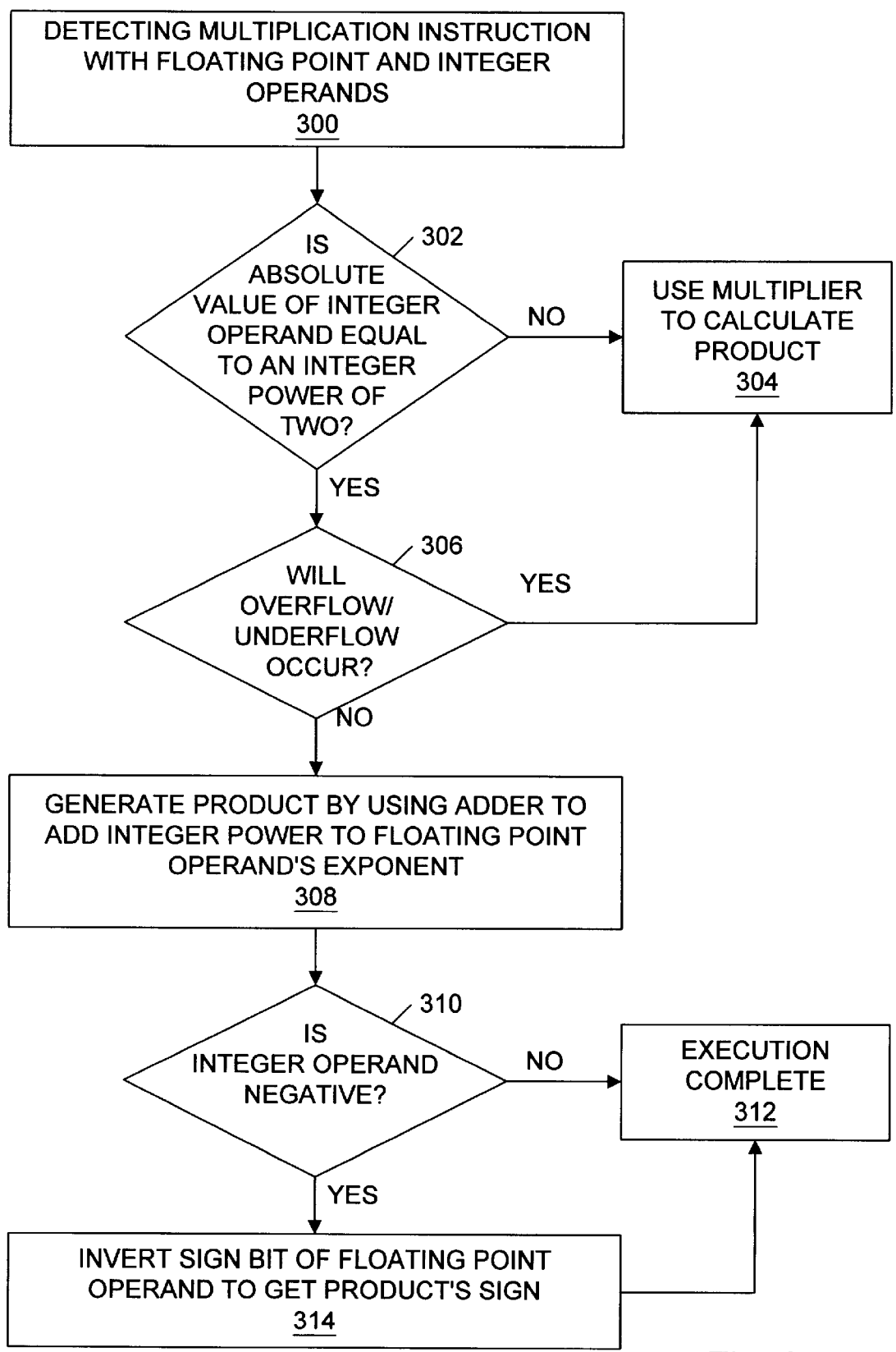
FIG. 3 is a flowchart illustrating one embodiment of a method for fast multiplication.

Turning now to FIG. 3, a flowchart showing one embodiment of a method for fast multiplication of selected integer and floating point values is shown. First, each multiplication instruction is examined to determine whether or not one operand is a floating point operand and one operand is an integer (step 300). The type of operands to be multiplied may be determined by the presence of load instructions preceding the multiplication instruction. For example, the following code segment implements a floating point multiplication of an integer and a floating point value using x86 instructions:

| | | |
|---|---|---|
| FLD | DWORD PTR [float_number] | ; load floating point number to FPU stack |
| FILD | DWORD PTR [integer_2] | ; translate int to float and load to FPU stack |
| FMUL | ST,ST(1) | ; multiply (top of stack) and (top of stack−1) |
| FSTP | DWORD PTR[float_number] | ; store results to destination |

As this exemplary code illustrates, FILD and FLD instructions preceding FMUL instructions may be detected (either in hardware or software) to determine whether a multiplication of an integer and floating point unit is being performed. Occurrences of the FIMUL instruction (convert integer to floating point, then multiply) may also be detected. Note, in other embodiments other instructions from other instruction sets may be detected (e.g., non-x86 instruction sets).

Another possible method for determining when an integer and floating point value are being multiplied is to examine the actual operands supplied to the FMUL instruction. This step may effectively be combined with the determination of whether the operand is an integer power of two (step 302). This is possible because integer powers of two (disregarding out of limit values such as denormals), when represented as floating point values, have mantissa bits to the right of the binary radix point that are all unasserted (zeros). This is illustrated in FIG. 4, which shows a floating point representation of an integer power of two, $2^3$. As a result, integer powers of two may be detected by examining the mantissa bits of the operands to FMUL and FIMUL instructions. This may be accomplished in a number of ways. For example, one possible hardware implementation may comprise a multiple-input NOR gate coupled to receive the mantissa bits of an operand. The output of the NOR gate may be used to signal the presence of an integer power of two. Note, as used herein the term "integer power of two" refers to integer values that may be represented as powers of two, wherein the exponent is also an integer. For example, $\pm 2^{-1}$, $\pm 2^0$, $\pm 2^1$, $\pm 2^2$, $\pm 2^3$, et seq., are all integer powers of two.

If there is no integer operand, or if the integer operand is not an integer power of two, then the multiplication instruction is executed as a standard floating point multiplication instruction without acceleration, i.e., using the microprocessor's multiplier (step 304). If, on the other hand, the multiplication instruction does have an integer operand that is an integer power of two, both operands are examined to determine if an overflow or underflow may occur. An overflow occurs when the result of the floating point multiplication is too large to represent in the current format. Similarly, an underflow occurs when the result of the floating point multiplication is too small to represent. A number of different methods may be used to detect the possibility of overflows or underflows. For example, each operand's exponent may be examined to ensure that it is not above or below a predetermined value that could cause an overflow or underflow. If an overflow or underflow is possible, the multiplication operation may be routed to the multiplier for normal execution.

If the operand values will not cause an overflow, the exponent portion of the floating point operand and the integer's exponent (unbiased) are routed to an adder for addition. However, when the integer operand is translated into floating point format, its exponent (or power of two) is biased. For example, if the integer operand initially has a value of $8_{10}$, or $2^3$, its exponent will be $130_{10}$ in single precision, $1026_{10}$ in double precision, and $16386_{10}$ in extended precision. Thus, in one embodiment the bias of the integer's exponent is subtracted after the addition to ensure the resulting product has the correct bias. In another embodiment, the bias may be subtracted before the addition is performed. If the integer's unbiased exponent is negative, e.g., $2^{-3}$, the unbiased exponent may be translated into two's complement form and then added to the floating point operand's operand. In another embodiment, a subtraction instruction may be issued using the magnitude of the integer's unbiased exponent.

In a software embodiment, the multiplication instruction may be translated into an addition instruction. The following x86 code segment illustrates a single precision floating point multiplication instruction having an integer operand equal to an integer power of two:

| | | |
|---|---|---|
| FLD | DWORD PTR [float_number] | ; load floating point number to FPU stack |
| FILD | DWORD PTR [integer_2] | ; translate int to float and load to FPU stack |
| FMUL | ST,ST(1) | ; multiply (top of stack) and (top of stack−1) |
| FSTP | DWORD PTR[float_number] | ; store results to destination |

Assuming the variable at [integer_2] is equal to $2^1$, the multiplication instruction may be translated into the following integer addition instruction:

| | | |
|---|---|---|
| MOV | EAX, DWORD PTR [float_number] | ; load float to EAX register |
| ADD | EAX, 00800000H | ; add int's exp less bias to float's exponents |
| MOV | DWORD PTR [float_number], EAX | ; output contents of EAX register |

The product generated by this addition operation may be represented by the following equation: $P_{SINGLE\_PRECISION} = (-1)^{S+S'} \times 2^{(be-127+n)} \times 1.f$, wherein s is the sign bit of the floating point operand, s' is the sign bit of the floating point representation of the integer operand, be is the biased exponent of the floating point operand, n is the biased exponent of the floating point representation of the integer operand, and f is the mantissa of the floating point operand.

FIGS. 5 and 6 illustrate the exemplary translations for a double precision multiplication and an extended precision multiplication, respectively. The product generated by the translation for the double precision operation may be represented by the following equation: $P_{DOUBLE\_PRECISION} = (-1)^{S+S'} \times 2^{(be-1023+n)} \times 1.f$ The product generated by the extended precision operation may be represented by this equation: $P_{EXTENDED\_PRECISION} = (-1)^{S+S'} \times 2^{(be-16283+n)} \times 0.f$.

If, however, the integer's exponent is negative (i.e., less than zero before biasing), then the integer's biased exponent is subtracted from the floating point exponent. The single precision product generated by this subtraction operation may be represented by the following equation: $P_{SINGLE\_PRECISION} = (-1)^{S+S'} \times 2^{(be-1271-n)} \times 1.f$. Similarly, the products generated by the double precision and extended precision subtractions are represented by the following equations: $P_{DOUBLE\_PRECISION} = (-1)^{S+S'} \times 2^{(be-1023+n)} \times 1.f$, and $P_{EXTENDED\_PRECISION} = (-1)^{S+S'} \times 2^{(be-16383+n)} \times 0.f$.

If the integer is not negative (step 310), then execution is complete (step 312). If the integer is negative, the sign bit of the resulting operand is inverted (step 314). Using the exemplary multiplication instruction from above, this may be accomplished during the addition (step 308) using the following instruction sequence:

| | | |
|---|---|---|
| MOV | EAX, DWORD PTR [float_number] | ; load float to EAX register |
| ADD | EAX, 8800000H | ; invert sign, add int's and float's exponent |
| MOV | DWORD PTR [float_number], EAX | ; output contents of EAX register |

Other implementations are also possible. For example, in hardware the most significant bit of the floating point operand may be conditionally inverted based upon the sign bit of the integer operand.

Advantageously, these translations may save a number of clock cycles during execution because integer additions typically require substantially less time to execute than with floating point multiplications. As microprocessors may have more than one integer adder, it may be possible to execute more than one of these "translated" multiplication operations per clock cycle.

Note the embodiments illustrated in the figures and described above are for exemplary purposes and are not meant to be limiting. Other embodiments are also possible and contemplated. For example, detection of overflow/underflow (step 306) may occur after the product is generated (step 308). If an overflow or underflow is detected in the result from the addition, the results may simply be discarded and the instruction may be routed to the multiplier for normal execution and execution handling (step 304). Furthermore, in some embodiments detection of overflow and underflow conditions may not be necessary, e.g., if the range of the input operand values is known. In other embodiments, a number of the steps illustrated may also be performed in parallel (e.g., steps 300, 302, and 306).

As noted above, the method disclosed may also be implemented in hardware, e.g., within a multiplier. In one embodiment, the multiplier may be configured to scan the operands as they are received to determine whether or not to route the instruction to an adder. A micro-code ROM may be used to store the alternate addition sequence of instructions if necessary. A dedicated adder may be used, or the exponent portions of the multiplication instruction's operands may be routed to an integer functional unit configured to execute integer addition instructions. In another embodiment, the multiplier may be configured with comparison logic (e.g., a multiple input NOR gate) configured to detect operands that are integer powers of two. If such an operand is detected, a demultiplexer within the multiplier may be configured to route the operands (or portions thereof) to an adder instead of the multiplier's normal hardware. Advantageously, instruction throughput may be increased because the multiplier may be able to execute a second independent multiplication operation while the adder is performing the first multiplication operation.

The method disclosed above may also be adapted for use in software such as compilers or device drivers. As part of a compiler's optimization routine, floating point instructions having integer operands that are integer powers of two may be replaced with addition code segments similar to the exemplary code segments listed above. This method may also be of particular utility in optimizing code written for compressing and decompressing information such as digitized audio and video information. Certain compression and decompression algorithms, e.g., AC-3 audio decoding, may repeatedly multiply digitized data by constants that may be integer powers of two. Dynamically linked libraries (DLLs) configured to perform such decoding may also be optimized in this manner.

Figure 7:
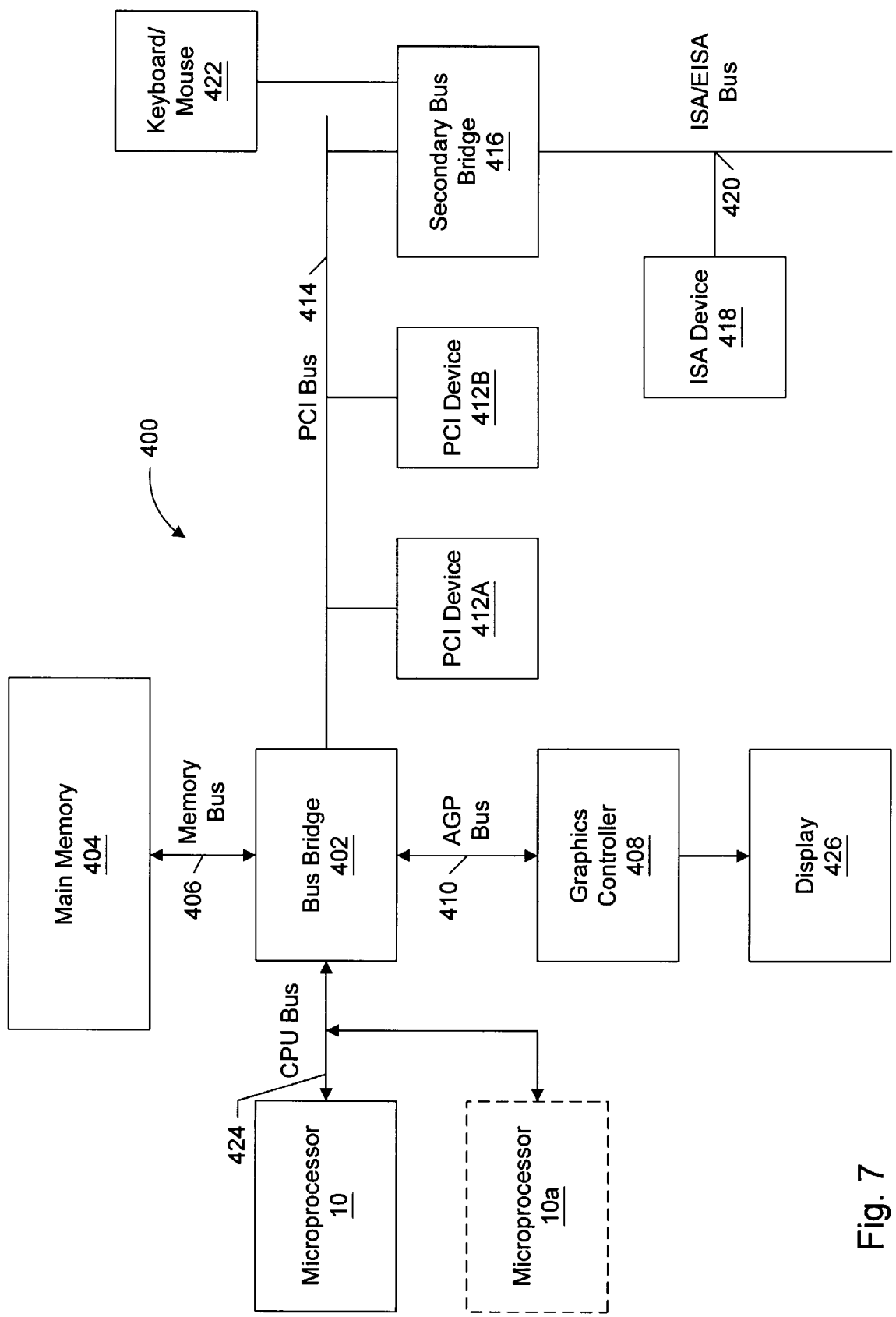
FIG. 7 is a block diagram illustrating one exemplary embodiment of a computer system.

Turning now to FIG. 7, a block diagram of one embodiment of an exemplary computer system 400 configured to execute the software disclosed above is shown. Note that microprocessors 10 and 10a may also be configured with a multiplier as disclosed above. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for performing fast multiplication in a microprocessor comprising:
    detecting multiplication instructions having a floating point operand and an integer operand;
    determining whether said integer operand has an absolute value equal to an integer power of two; and
    calculating a product, wherein said calculating comprises using a multiplier to multiply said floating point operand and said integer operand if said absolute value is not equal to said integer power of two, wherein said calculating comprises generating a product mantissa by copying the floating point operand's mantissa bits and generating a product exponent by using an adder to sum said integer power with said floating point operand's exponent if said absolute value is equal to said integer power of two.

2. The method as recited in claim 1, wherein said calculating further comprises generating a product sign bit by inverting said floating point operand's sign bit if said integer operand is negative and said absolute value equals said integer power of two.

3. The method as recited in claim 2, wherein said determining is performed using comparison logic.

4. The method as recited in claim 3, wherein said comparison logic comprises a multiple input NOR gate.

5. The method as recited in claim 2, wherein said generating further comprises subtracting the integer operand's exponent bias from the floating point operand's exponent if said absolute value is equal to said integer power of two.

6. The method as recited in claim 2, wherein said adder is an integer functional unit.

7. The method as recited in claim 2, wherein said adder is a dedicated adder.

8. The method as recited in claim 2, further comprising normalizing said product if said absolute value is not equal to said integer power of two.

9. A method for accelerating the decompression of compressed data in a microprocessor, the method comprising:
    detecting decompression instructions that multiply a floating point operand and an integer value to form a product;
    determining whether said integer value has an absolute value equal to an integer power of two;
    forming said product by adding said integer power to said floating point operand's exponent if said absolute value is equal to said integer power of two; and
    forming said product by multiplying said floating point operand and said integer value if said absolute value is not equal to said integer power of two.

10. The method as recited in claim 9, further comprising inverting said floating point operand's sign bit if said integer operand is negative and said absolute value is equal to said integer power of two.

11. The method as recited in claim 10, further comprising subtracting said integer power's exponent bias from said floating point operand's exponent if said absolute value is equal to said integer power of two.

12. A microprocessor comprising:
    a means for detecting multiplication instructions having a floating point operand and an integer operand, wherein said integer operand has an absolute value equal to an integer power of two; and
    a means for performing said multiplication instructions by adding said integer power to said floating point operand's exponent.

13. The microprocessor as recited in claim 12, wherein said means for performing is configured to replace said multiplication instructions with addition instructions, wherein said addition instructions are configured to add said integer power to said floating point operand's exponent.

14. The microprocessor as recited in claim 13, further comprising an adder coupled to receive and execute said addition instructions.

15. The microprocessor as recited in claim 14, further comprising an inverter coupled to said detection means and configured to invert said floating point operand's sign bit if said integer operand is negative.

16. A processor capable of performing fast floating point multiplication comprising:
    an adder;
    a multiplier;
    comparison logic coupled to receive and compare two multiplication operands from a first multiplication operation, wherein said comparison logic is configured to determine if said first operand is an integer power of two;
    a demultiplexer coupled to said adder, said multiplier, and said comparison logic, wherein said demultiplexer is controlled by said comparison logic and is configured to route at least a portion of each operand to said multiplier if said first operand is not an integer power of two, wherein said demultiplexer is configured to route at least a portion of each operand to said adder if said first operand equals said integer power of two, wherein said adder is configured to sum said integer power of two and said second operand's exponent; and
    an inverter coupled to said demultiplexer, wherein said inverter is configured to invert said second multiplication operand's sign bit if said absolute value equals said integer power of two and said first operand is negative.

17. The microprocessor as recited in claim 16, wherein said multiplier is configured to perform a second independent multiplication operation while said adder is summing said integer power of two and said second operand's exponent.

18. An optimizing software compiler embodied on computer-readable media comprising:

a first plurality of instructions configured to detect multiplication instructions having a floating point operand and a constant integer operand having an absolute value equaling an integer power of two; and a second plurality of instructions configured to replace said multiplication instruction with an addition instruction, wherein said addition instruction is configured to add said integer power to said floating point operand's exponent.

19. The optimizing software compiler as recited in claim 16 wherein said addition instruction is further configured to invert said floating point operand's sign bit if said integer is negative.

20. A method of using a computer processor to decode compressed audio or video data comprising:

receiving compressed audio or video data;

decompressing the compressed audio or video data, wherein said decompressing comprises:

detecting a floating point value within said compressed audio or video data that is to be multiplied by an integer value to form a product;

determining whether said integer value has an absolute value equal to an integer power of two, and, if said integer value has an absolute value equal to an integer power of two, forming said product by: (i) adding said integer power to said floating point value's exponent, and (ii) inverting said floating point value's sign bits if said integer value is negative, and, if said integer value has an absolute value not equal to an integer power of two, forming said product by multiplying the floating point value and the integer value, and outputting the decompressed audio or video data to generate audible sounds or visible images.

* * * * *